US010180863B2

(12) United States Patent
Sawhney et al.

(10) Patent No.: US 10,180,863 B2
(45) Date of Patent: Jan. 15, 2019

(54) DETERMINING SYSTEM INFORMATION BASED ON OBJECT MUTATION EVENTS

(71) Applicant: Oracle International Corporation, Redwood Shores, CA (US)

(72) Inventors: Aditya Sawhney, Erie, CO (US); Venkat Pavan Kumar Bellapu Konda, Englewood, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/338,697

(22) Filed: Oct. 31, 2016

(65) Prior Publication Data

US 2018/0121264 A1    May 3, 2018

(51) Int. Cl.
  *G06F 9/54*   (2006.01)
  *H04W 72/04*  (2009.01)
(52) U.S. Cl.
  CPC ......... *G06F 9/542* (2013.01); *H04W 72/0406* (2013.01)
(58) Field of Classification Search
  None
  See application file for complete search history.

(56) References Cited

U.S. PATENT DOCUMENTS

| 5,544,347 | A | 8/1996 | Yanai et al. |
| 6,108,748 | A | 8/2000 | Ofek et al. |
| 6,157,612 | A * | 12/2000 | Weerackody ........ H04B 7/0604 370/215 |
| 6,714,553 | B1 * | 3/2004 | Poole ................. H04L 12/4625 370/412 |
| 7,035,971 | B1 | 4/2006 | Merchant |
| 7,263,593 | B2 | 8/2007 | Honda et al. |
| 7,707,151 | B1 | 4/2010 | Blumenau et al. |
| 8,521,973 | B2 | 8/2013 | Rowan et al. |
| 8,973,034 | B1 | 3/2015 | Harvey et al. |
| 9,037,538 | B2 | 5/2015 | Sampathkumar |
| 9,396,287 | B1 | 7/2016 | Bhave et al. |
| 9,501,507 | B1 | 11/2016 | Harris et al. |
| 9,507,843 | B1 | 11/2016 | Madhavarapu et al. |
| 9,524,302 | B2 | 12/2016 | Regni et al. |
| 9,720,989 | B2 * | 8/2017 | Theimer .......... G06F 17/30569 |
| 9,864,774 | B2 | 1/2018 | Marcotte |

(Continued)

FOREIGN PATENT DOCUMENTS

KR    10-2015-0088531 A    8/2015

*Primary Examiner* — Charles E Anya
*Assistant Examiner* — Phuong N Hoang
(74) *Attorney, Agent, or Firm* — Invoke

(57) ABSTRACT

A consumer transmits a set of system updates corresponding to an initial set of events retrieved from an event stream. The consumer determines that acknowledgement of the transmission of the initial set of events has not been received. The consumer executes another retrieval operation to retrieve events from the event stream which results in retrieving an updated set of events. The updated set of events includes the initial set of events and one or more additional events. The consumer trims the updated set of events to remove the one or more additional events and obtains the initial set of events. The consumer re-determines and re-transmits the system updates corresponding to the initial set of events that were obtained by trimming the updated set of events.

19 Claims, 6 Drawing Sheets

(56) References Cited

U.S. PATENT DOCUMENTS

| | | |
|---|---|---|
| 2001/0016843 A1 | 8/2001 | Olson et al. |
| 2002/0143494 A1 | 10/2002 | Conrad |
| 2004/0153458 A1 | 8/2004 | Noble et al. |
| 2006/0072400 A1 | 4/2006 | Anderson et al. |
| 2006/0218558 A1 | 9/2006 | Torii et al. |
| 2006/0271420 A1 | 11/2006 | Anselmann et al. |
| 2007/0239944 A1 | 10/2007 | Rupanagunta et al. |
| 2010/0205160 A1 | 8/2010 | Kumar et al. |
| 2010/0257995 A1 | 10/2010 | Kamiya |
| 2010/0322475 A1 | 12/2010 | Ikeda |
| 2011/0013631 A1* | 1/2011 | Frydman ............ H04L 12/1827 370/390 |
| 2011/0119100 A1 | 5/2011 | Ruhl et al. |
| 2011/0164614 A1* | 7/2011 | Begeja ............. H04N 21/26275 370/390 |
| 2011/0196900 A1 | 8/2011 | Drobychev et al. |
| 2011/0246429 A1 | 10/2011 | Prahlad et al. |
| 2012/0072412 A1 | 3/2012 | Bestgen et al. |
| 2012/0254116 A1 | 10/2012 | Thereska et al. |
| 2012/0311586 A1 | 12/2012 | Inagaki |
| 2013/0311555 A1 | 11/2013 | Laoutaris et al. |
| 2014/0122022 A1 | 5/2014 | Chen et al. |
| 2014/0180461 A1 | 6/2014 | Heck et al. |
| 2014/0280986 A1* | 9/2014 | Baulier .................. H04L 67/10 709/227 |
| 2015/0234897 A1 | 8/2015 | Kuninobu et al. |
| 2015/0278092 A1* | 10/2015 | Smentek ............... G06F 9/5016 711/119 |
| 2015/0339314 A1 | 11/2015 | Collins et al. |
| 2015/0355824 A1 | 12/2015 | Ueno |
| 2015/0363271 A1 | 12/2015 | Haustein et al. |
| 2015/0370505 A1 | 12/2015 | Shuma et al. |
| 2016/0006673 A1* | 1/2016 | Thomas ................. G06F 9/544 709/226 |
| 2016/0026409 A1 | 1/2016 | Tanaka et al. |
| 2016/0105370 A1* | 4/2016 | Mellor .................. H04L 45/02 709/226 |
| 2016/0202693 A1 | 7/2016 | Noda et al. |
| 2016/0306822 A1 | 10/2016 | Waghulde |
| 2016/0335550 A1 | 11/2016 | Achin et al. |
| 2016/0342486 A1 | 11/2016 | Kedem et al. |
| 2017/0351543 A1 | 12/2017 | Kimura |
| 2017/0371887 A1 | 12/2017 | Balasubramanian et al. |
| 2018/0075069 A1 | 3/2018 | Guim et al. |

\* cited by examiner

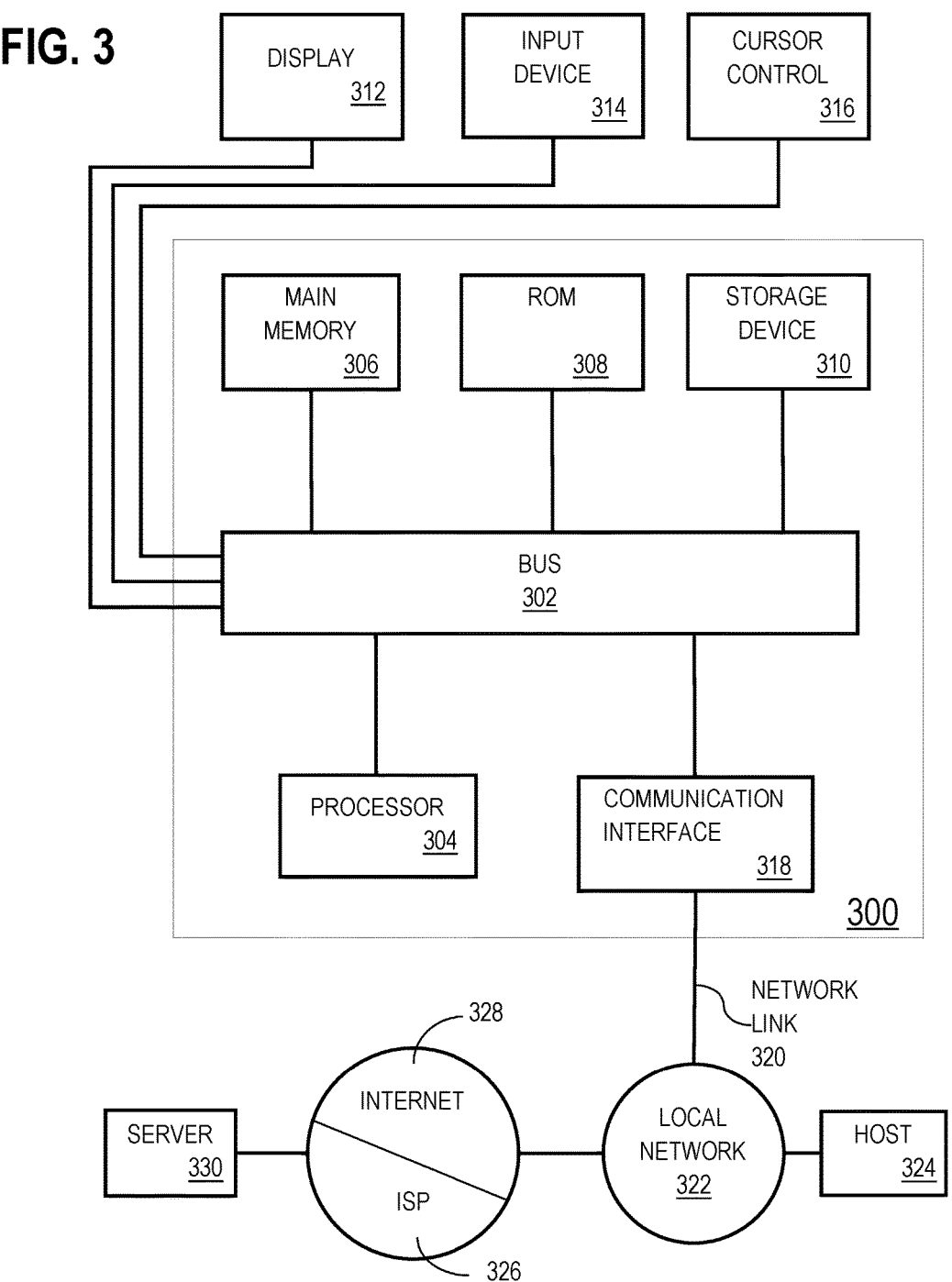

DETERMINING SYSTEM INFORMATION BASED ON OBJECT MUTATION EVENTS

TECHNICAL FIELD

The present disclosure relates to maintaining and updating storage system information. In particular, the present disclosure relates to determining and transmitting system information updates based on object mutation events published in an event stream.

BACKGROUND

Objects may be stored in a storage system according to various storage architectures. Examples of storage architectures include an object storage, a file system, a block storage, and/or a database.

An object may include data and metadata. Object data includes, for example, information that is used by an end user and/or a business application. As an example, data for a Sales Application may include information about customers, products, and sales. As another example, data for a Human Resources Application may include information about employees, departments, and salaries. Object metadata may describe information about the data. As an example, object metadata may indicate how the data is set up, structured, and/or stored. Object metadata may indicate when the data was generated or when the data was modified. Object metadata may be used to manipulate and/or manage the objects in a storage system.

Objects may be added to a database, deleted from a database, or modified. Adding, deleting, or modifying objects may be referred to herein as an Object Mutation Event (OME). Information describing OMEs for a particular object may be continuously published in one of a set of event streams.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 shows a block diagram that illustrates a computer system in accordance with one or more embodiments.

DETAILED DESCRIPTION

Figure 1A:
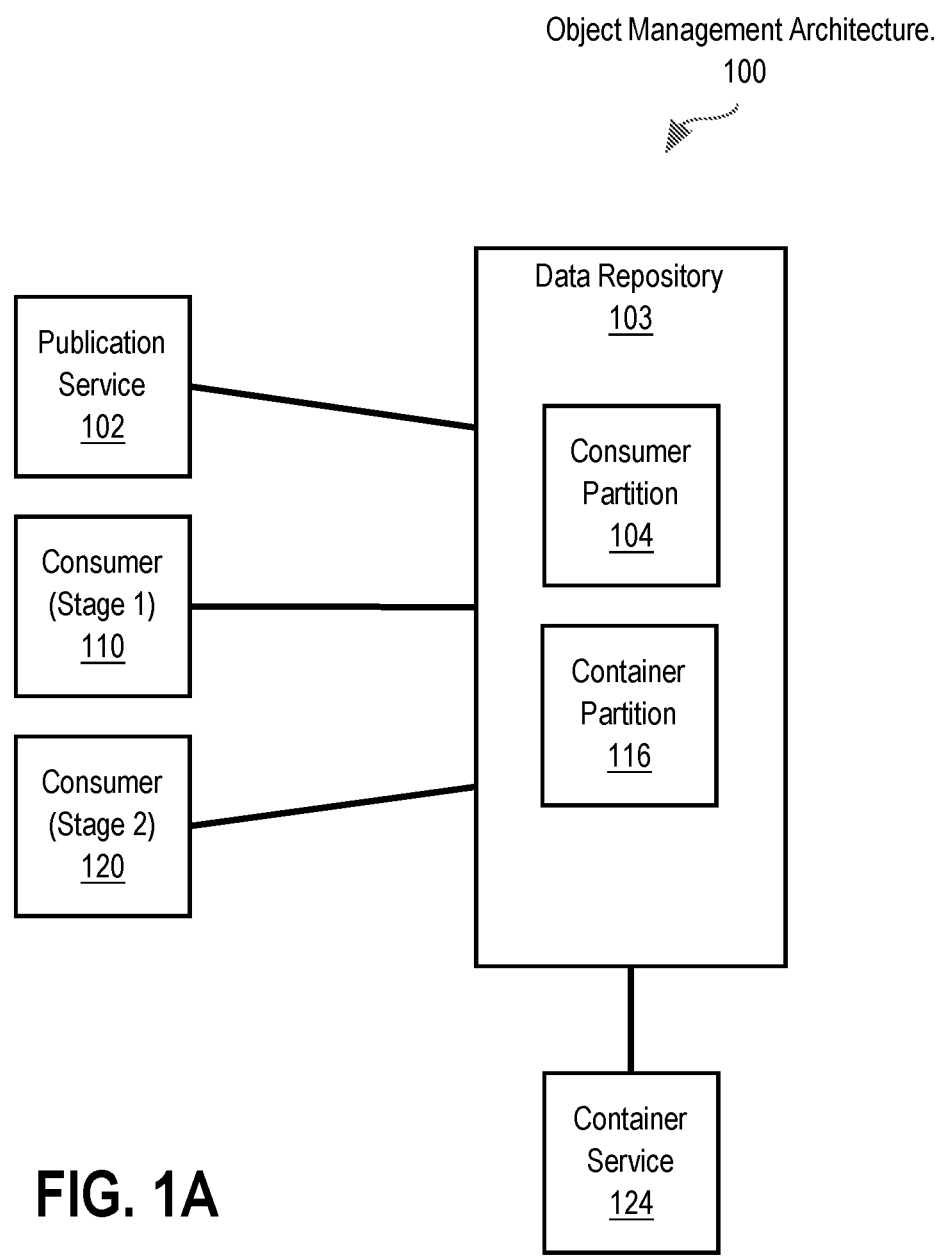
FIGS. 1A-1B illustrate a system information management architecture, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM INFORMATION MANAGEMENT ARCHITECTURE
3. DETERMINING AND TRANSMITTING SYSTEM UPDATES BASED ON OBJECT MUTATION EVENTS
4. MISCELLANEOUS; EXTENSIONS
5. HARDWARE OVERVIEW

1. General Overview

One or more embodiments include determining and transmitting system updates based on object mutation events published in an event stream. Object mutation events may include, but are not limited to, inserting objects in a container, deleting objects from a container, and modifying objects in a container. Systems updates, based on the object mutation events, may specify a change in a number of objects in the container or a change in a size of the container.

A publisher publishes object mutation events to an event stream. A consumer executes an initial retrieval operation to retrieve events from the event stream. The events retrieved by executing the initial retrieval operation include (a) a particular event corresponding to an offset identified by a start-read-pointer and (b) events that have been published subsequent to the particular event in the event stream at the time of the initial retrieval operation. The consumer determines and transmits a set of system updates based on the set of initially retrieved events. The consumer determines that acknowledgement for transmission of the set of system updates has not been received. Responsive to determining that acknowledgement has not received, the consumer executes a second retrieval operation to retrieve events from the event stream. Executing the second retrieving operation includes the consumer retrieving some of the events that are in the event stream when the second retrieving operation is executed. Specifically, the second retrieval operation results in retrieving an updated set of events which include the previously retrieved first set of events and one or more additional events. The one or more additional events were published by the publisher between the time the consumer executed the initial retrieval operation and the time the consumer executed the second retrieval operation. The consumer trims the updated set of events by removing the one or more additional events to re-obtain the previously retrieved first set of events. The consumer re-determines and re-transmits the set of system updates based on the first set of events.

One or more embodiments described in this Specification and/or recited in the claims may not be included in this General Overview section.

2. System Information Management Architecture

In an embodiment, a vendor manages a cloud environment used for storing data and providing services to multiple tenants. Each tenant may purchase data storage space and services from the vendor. The vendor may use data isolation techniques to separate data corresponding to different tenants. As an example, a service or component associated with one tenant may be restricted to only accessing data corresponding to the same tenant. A vendor may implement a system information management architecture, as described herein, to maintain and update system information for systems that are used to store data and or provide services. System information is updated via system updates which are determined based on Object Mutation Events (OMEs), as described below.

Systems that are used to store data or provide services may maintain database objects (may be referred to herein as "objects"). A database object is any defined data structure in a database that includes data. Some examples of database objects include tables, views, clusters, sequences, indexes, and synonyms. A database object may refer to a single row of data within a table.

In an embodiment, an Object Mutation Event (OME) is an event associated with an object. An OME may include, but is not limited to, an object creation event, an object modification event, and an object deletion event. An object creation event is an event in which a new object is stored to a database. A "put" command may be executed for performing an object creation event. The new object may be unique within the database or may be a copy of another object already in the database (stored with a different identifier). An object deletion event is an event in which an object is deleted from a database. Deletion may refer, for example, to marking an object for deletion, deleting pointers to the object, or reclaiming memory allocated for storing the object. A "delete" command may be executed for performing an object deletion event. An object modification event is an event in which an object currently stored within the database is modified. Modification of an object may include overwriting the object by overwriting data stored in physical memory corresponding to the object. Modification of an object may include adding a new version of an object to a database without overwriting a prior version of the object. A "put" command may be executed for adding a new version of an object to a database in combination with execution of a "delete" command to remove a prior version of the same object.

In an embodiment, database objects may be grouped into one of a set of containers. A container correspond to a logical grouping, a physical memory grouping, or any other type of grouping used for the organization, management, analysis, and/or manipulation of objects. Each set of containers may further be grouped into a particular account of a set of accounts. Each account may correspond to a tenant account or a customer account.

A vendor may implement a system information management architecture, as described herein, to maintain and update system information for systems that are used to store data and or provide services. System information may include, but is not limited to, a number of data objects corresponding to a particular tenant, a size of data objects corresponding to the particular tenant, a total sum of sizes corresponding to data objects corresponding to the particular tenant, and a size of each container (with data objects) corresponding to the particular tenant. Embodiments herein describe techniques to determine and update the system information. The system information may be used for any purpose, including charging a tenant, predicting a tenant's future usage needs, and providing recommendations to a tenant.

An OME, described above, may result in an update to the system information. The respective size of each of the objects in a container may be totaled to determine a size for the container. When an object is added to a container, the size of the container increases based on the size of the added object. When an object is deleted from a container, the size of the container decreases based on the size of deleted object. When the size of an object is modified, the size of the container is modified based on the change in the size of the object. A number of objects within a container may be maintained and updated based on the addition and deletion of objects.

As an example, an OME may indicate that an object X (of size 10 KB) is added to a container Y (of size 100 KB). A system update, based on the OME, may indicate: "+10 KB for container Y." Based on the system update, the system information identifying the size of container Y as 100 KB may be updated to indicate the size of container Y as 110 KB. If a later OME indicates that the object is modified which results in a reduction in size of object X from 10 KB to 8 KB, a second system update may indicate "−2 KB for container Y". Based on the second system update, the system information identifying the size of container Y as 100 KB may be updated to indicate the size of container Y as 108 KB. An object Z of size 20 KB may then be deleted from container Y. A third system update may indicate: "−20 KB for container Y" based on the deletion of object Z from container Y. Based on the third system update, the system information identifying the size of container Y as 108 KB may be updated to indicate the size of container Y as 88 KB.

As another example, system information may indicate a number of objects within a particular container, or within a set of containers associated with a tenant. A system update may reflect an update to a number of objects within a container based on an OME. A system update may indicate "C1: +1" representing an increase of one object in container C1. A system update may indicate "C2: +0" representing no change in a number of objects in container C2. As understood by a person skilled in the art, the actual content of a system update or of system information may be more succinct, more detailed, or otherwise different than the examples recited herein. Simple or overly-generalized examples are recited herein for purposes of explanation.

Figure 1B:
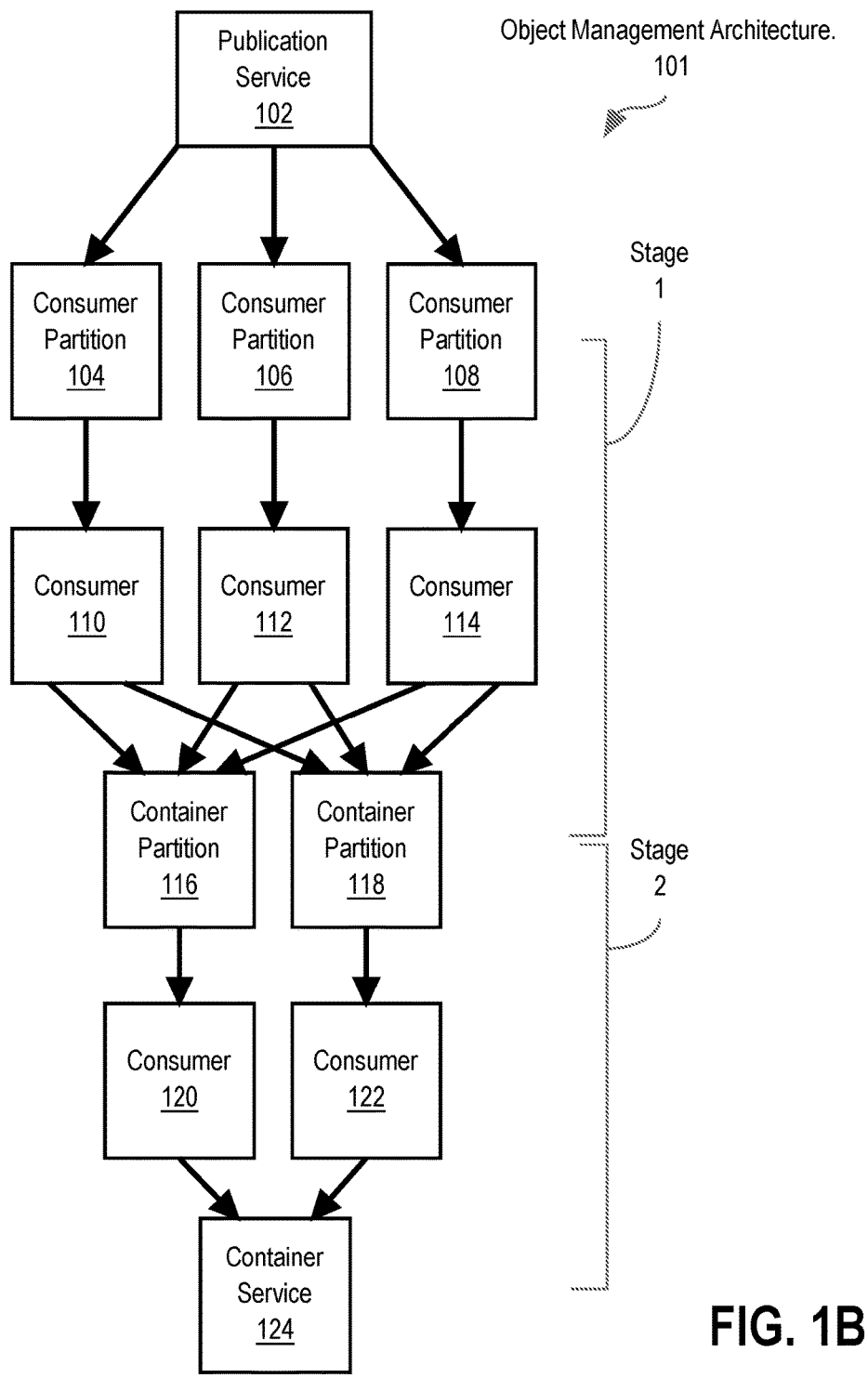

FIGS. 1A and 1B illustrate block diagrams representing system information management architectures in accordance with one or more embodiments. An system information management architecture, as referred to herein, includes components for determining and applying system updates based on Object Mutation Events (OMEs) published in an event stream. A system information management architecture may include, but is not limited to, a publication service 102, consumer partitions (e.g., consumer partitions 104-108), stage one consumers (e.g., consumers 110-114), container partitions (e.g., a container partitions 116-118), stage two consumers (e.g., consumers 120-122), and a container service 124.

In one or more embodiments, the object management architectures 100 and 101 may include more or fewer components than the components illustrated respectively in FIGS. 1A and 1B. The components illustrated in FIGS. 1A and 1B may be local to or remote from each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

In one or more embodiments, a publication service 102 is a process that publishes information about OMEs. Publishing information about an OME may be referred to herein as publishing the OME itself for purposes for clarity and explanation. The publication service 102 may receive information about an OME, to be published by the publication service 102, from any component within a storage system. As an example, a component of a metadata tier, that determines whether an OME may be executed, may provide OME information to the publication service 102 or may itself implement the publication service 102. As another example, a component which requests execution of the OME, such as a client-facing database front-end, may provide OME information to the publication service 102 or may itself implement the publication service 102. The publication service 102 may receive the information about an OME and/or may publish the information about an OME in response to and/or subsequent to performance of the OME.

The publication service 102 may publish an OME to an event stream (also referred to herein as a "change stream"). An event stream, as referred to herein, includes a continuously updated set of information describing OMEs. Each event stream is stored in a respective consumer partition (e.g., consumer partitions 104, 106, and 108). A consumer partition may refer to a software and/or hardware storage component including OMEs consumed by a stage one consumer (e.g., consumer 110, 112, and 114). As an example, a consumer partition may refer to an array of OME information to be consumed by the respective consumer. A consumer partition may refer to a particular memory region allocated for storing OMEs that are to be consumed by the respective consumer.

A stage one consumer is a consumer that completes a first stage associated with the system information management architecture. The first stage includes a stage one consumer consuming OMEs from a respective consumer partition. Consuming OMEs includes a stage one consumer retrieving OMEs from the consumer partition and determining system updates based on the OMEs.

In an embodiment, a stage one consumer determines system updates in relation to a container. The stage one consumer determines the effect on an OME in relation to a container. As an example, the stage one consumer may determine a total change in a size of the container based on OME. In another example, the stage one consumer may determine a change in a number of objects in the container based on the addition (e.g., change="+1"), modification (e.g., change="0"), or deletion of objects (e.g., change="−1") in the container as indicated by an OME. The stage one consumer stores the system update, in relation to a container, into a corresponding container partition (e.g., container partition 116). Stage one is further described below with reference to FIG. 2.

In an embodiment, a stage two consumer consumes system updates, from a container partition, corresponding to a respective container. The stage two consumer aggregates the system updates for a container to determine a net update for the container. The stage two consumer transmits the net update to a container service (e.g., container service 124). The container service updates the system information in accordance with the net update.

As an example, a stage two consumer identifies the system updates for a container C1 as follows: C1:0, C1:+1, and C1:+1. The first system update C1:0 indicates no change in a number of objects due to a corresponding OME. The second system update C1:+1 indicates the addition of one object to container C1. The third system update C1:+1 also indicates the addition of one object to container C1. The net update determined as a function of the three updates is C1:+2. The net update C1:+2 indicates an addition of two objects to container C1. The stage two consumer transmits the net update to a container service for updating the system information. Specifically, a total number of objects for container C1 is increased by two.

3. Determining and Transmitting System Updates Based on Object Mutation Events

FIGS. 2A-2E illustrate an example set of operations for determining and transmitting system updates based on object mutation events, in accordance with one or more embodiments. One or more operations or illustrations described with reference to FIG. 2A or FIG. 2B may be modified, rearranged, or omitted all together. Accordingly, the particular description below should not be construed as limiting the scope of one or more embodiments.

An embodiment includes a consumer retrieving a current set of object mutation events (interchangeably referred to herein as "events" and "OMEs") from an event stream (Operation 202).

Figure 2A:
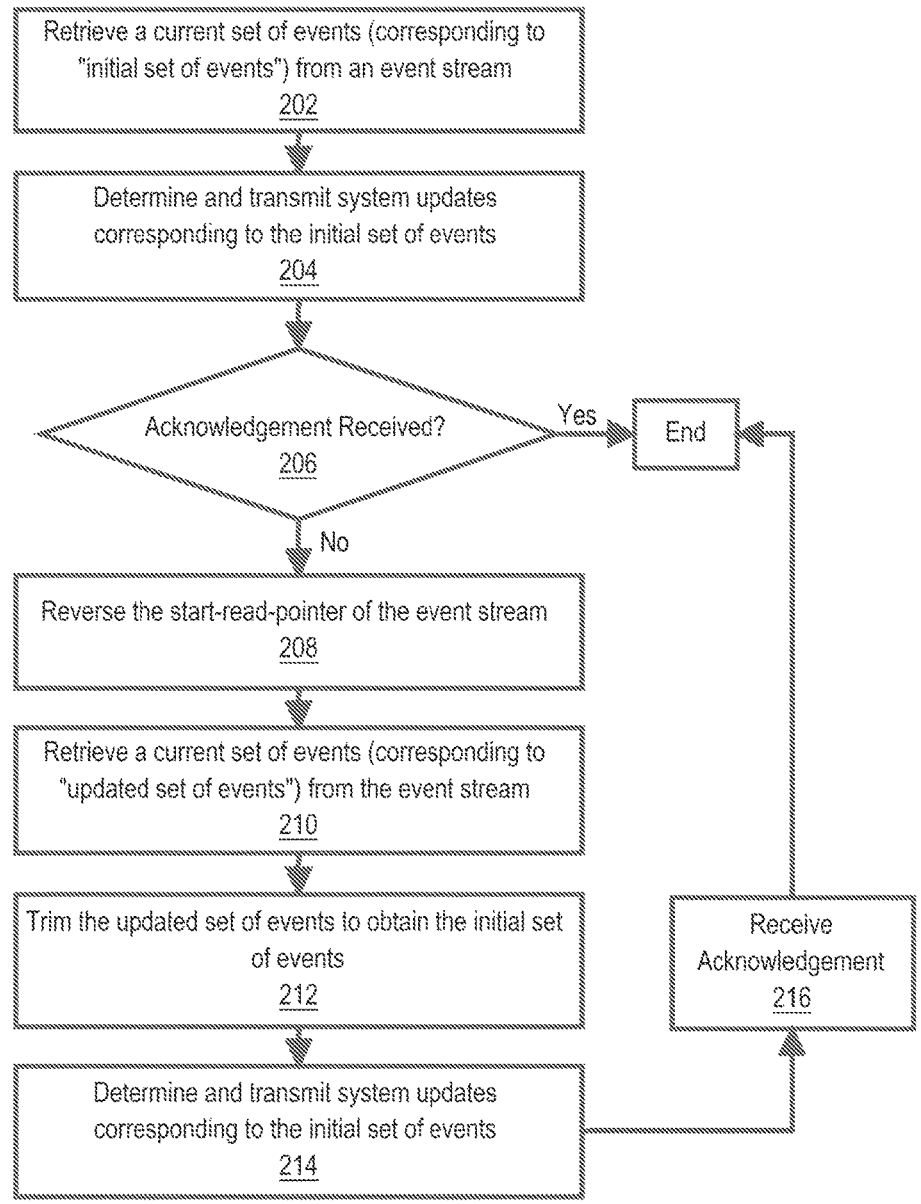
FIGS. 2A-2E illustrate operations for determining and transmitting system updates based on object mutation events in accordance with one or more embodiments.
Figure 2B:
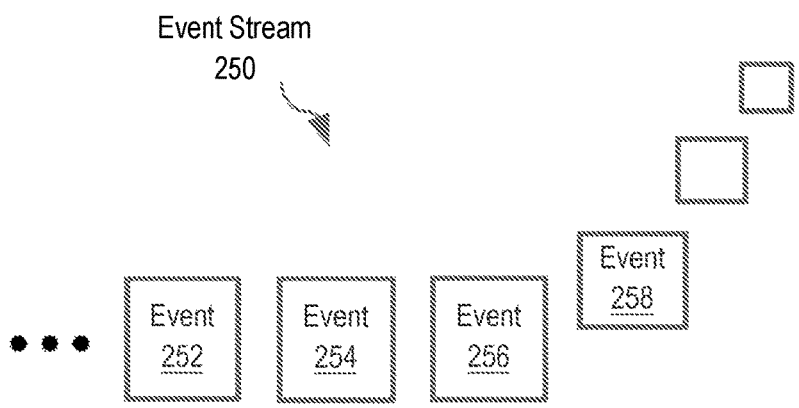

An example of an event stream is illustrated in FIG. 2B. Events 252-256 are illustrated in chronological order based on time of publication. A publication service publishes the event stream 250 to a consumer partition. FIG. 2B illustrates events 252-256 as having already been published to the event stream 250. Furthermore, event 258 is to be published by the publication service to the event stream.

The current set of events retrieved from the event stream include a particular event, in the event stream, that corresponds to a current value of a start-read-pointer. The current value of the start-read-pointer is a start offset value which is one greater than an end offset value of a prior retrieval operation. The current set of events further includes events subsequent to the particular event in the event stream at the time of the retrieval operation. The current set of events may include all events subsequent to the particular event in the event stream or subsequent events up to a maximum number of events that may be retrieved during any retrieving operation. The current set of events does not include events published prior to the particular event. The current set of events retrieved in Operation 202 are referred to herein as an "initial set of events" for purposes of explanation; however, it is to be understood that other events may have been published prior to the initial set of events.

Figure 2C:
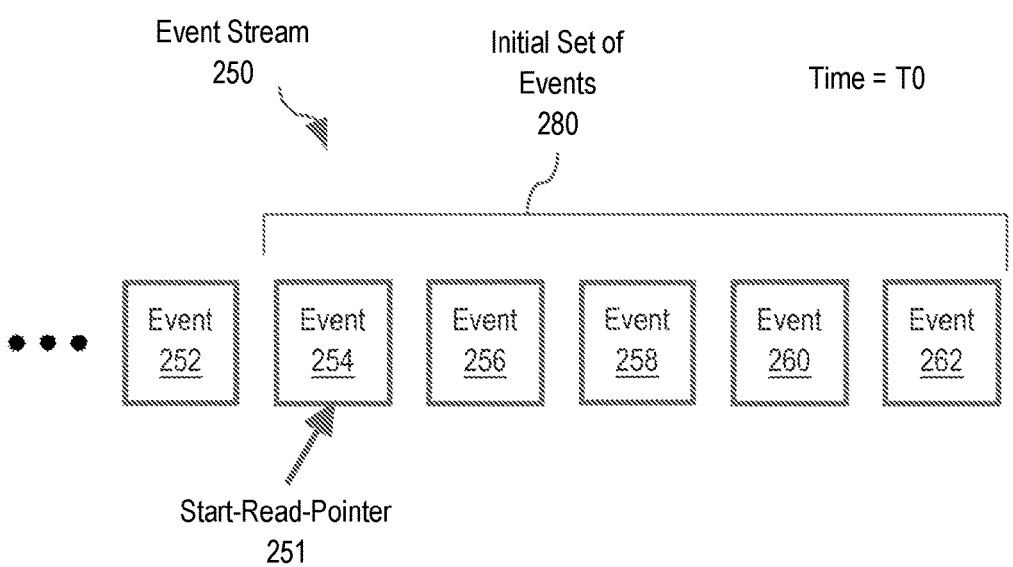

As an example, at time T0, the event stream 250 may include a set of events up to event 262, as illustrated in FIG. 2C. A start-read-pointer 251 may reference a particular event 254. Based on the start-read-pointer 251, the retrieval operation for retrieving a current set of events may result in retrieving event 254 and the events 256-262 which are subsequent to event 254 in the event stream. Events published prior to event 254 corresponding to the start-read-point 251 are not retrieved as a part of the initial set of events. Accordingly, event 252 is not retrieved as a part of the initial set of events.

Figure 2D:
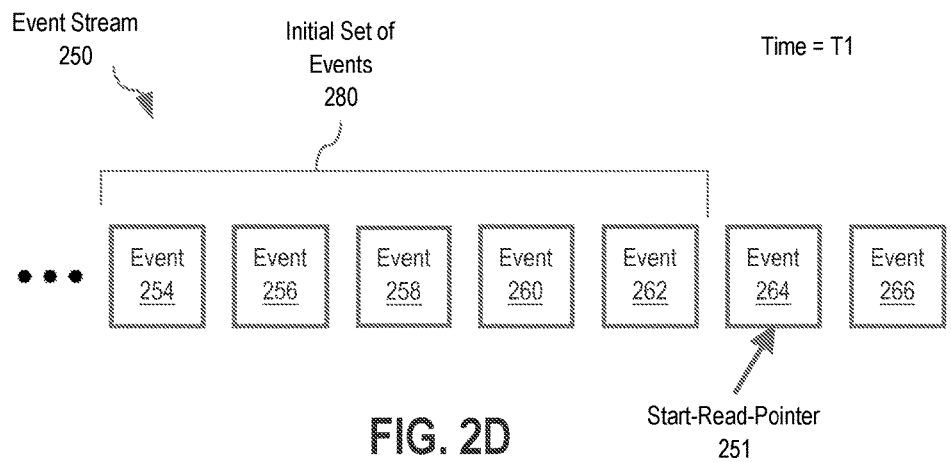

In an embodiment, the start-read-pointer may be advanced, in response to the retrieval of the initial set of events, to a next event subsequent to the retrieved initial set of events. Continuing the above example, events 264 and 266 have been added to the event stream by time Ti, as illustrated in FIG. 2D. Furthermore, the start-read-pointer 251 is advanced to event 264 which has been published subsequent to the events in the previously retrieved initial set of events 280.

In an embodiment, the consumer determines and publishes system updates based on the retrieved set of events (Operation 204). As noted above, the events retrieved in Operation 202 are referred to herein as the initial set of events. Accordingly, the consumer determines and transmits system updates based on the initial set of events. The system updates are transmitted to any entity which may update system information in accordance with the system updates. Determining and transmitting system updates based on events is described in detail above with reference to FIGS. 1A and 1B.

The consumer further determines if an acknowledgement for the transmitted system updates has been received (Operation 206). Determining whether the acknowledgement has been received may include waiting for a time-out period for receiving the acknowledgement. If the time-out period subsequent to transmitting the system updates has expired, and the acknowledgment has not been received, then the transmission of the system updates is determined to have failed.

As another example, a consumer, which determines and transmits the system updates, may itself fail subsequent to the transmission of the system updates. The consumer fails prior to and without receiving acknowledgement corresponding to the transmission of the system updates. The failed consumer is re-booted or otherwise corrected to return to a properly functioning state. Alternatively, another consumer may take over a state of the failed consumer and resume the operations being performed by the failed consumer. The consumer (corrected consumer or replacement consumer) may identify all system update transmissions which have not yet been acknowledged, such as the transmission described above with reference to Operation 204. The system update transmissions which have not yet been acknowledged may be identified as failed transmissions.

In response to determining that the acknowledgement corresponding to the transmission of the system updates has not been received, the consumer may enter a failure mode. In the failure mode, the consumer may execute and/or re-execute operations as needed (e.g., operations 208-214) until acknowledgement of the set of system updates is received. In an embodiment, a failure mode may include a consumer pausing the reading from consumer partitions other than the particular error-partition associated with unacknowledged system updates. Pausing the reading from consumer partitions, other than the error-partition, may allow the consumer to focus available resources on correcting the error. Pausing the read from other consumer partitions (different than the error-partition), may include pausing the reading subsequent to transmitting and receiving acknowledgement of system updates corresponding to the other partitions.

In an embodiment, the start-read-pointer is reversed (Operation 208). The start-read-pointer is reversed to the first event, in the previously retrieved initial set of events, referred to above as the "particular event". Reversing the start-read-pointer ensures that the previously retrieved events are again retrieved when another retrieval operation is executed (Operation 210). Executing the retrieval operation again results in retrieving the current set of events when the retrieval operations is re-executed. The current set of events, when the retrieval operation is re-executed, correspond to an updated set of events. The updated set of events includes the particular event and all events subsequent to the particular event. The events subsequent to the particular event may include one or more additional events that have been published since the previous retrieval of events in the event stream, described above with reference to operation 202. Accordingly, the updated set of events may include the previously retrieved initial set of events and one or more additional events.

Figure 2E:
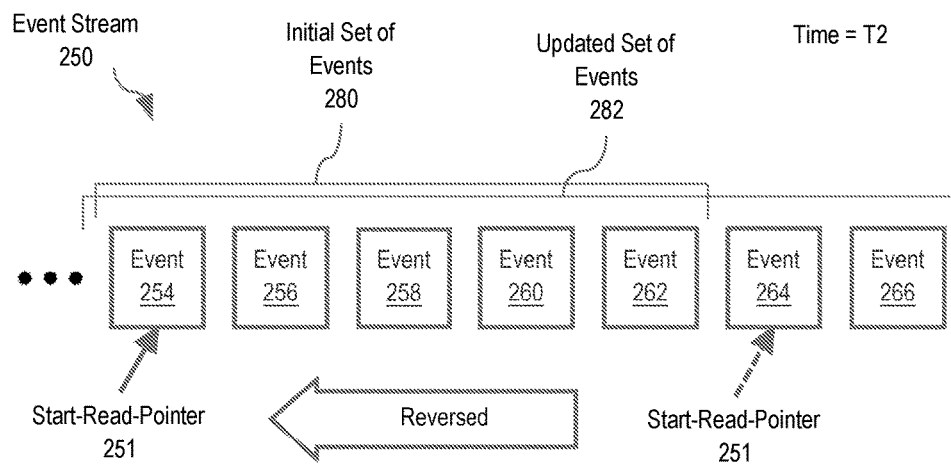

Continuing the above example, the start-read-pointer 251 is reversed from event 264 to event 254, as illustrated in FIG. 2E. The consumer executes another retrieval operation to retrieve the current events from the event stream 250. The current events now correspond to the updated set of events 282. The updated set of events 282 include the initial set of events 280, and in addition, event 264 and event 266.

In another embodiment, the start-read-pointer may not be advanced until acknowledgement of the transmission of system updates has been received. If the start-read-point is not advanced until acknowledgement of the transmission of the system updates has been received, the reversal of the start-read-pointer may not be required as described above.

In one or more embodiments, the consumer trims the one or more additional events from the updated set of events to obtain the previously retrieved initial set of events (Operation 212). As noted above, both the initial set of events and the updated set of events include the same particular event as a first event in each respective set of events. The consumer identifies an offset or identifier corresponding the last event in the initial set of events corresponding to the previously transmitted and unacknowledged system updates. The consumer trims any events in the updated set of events that are published subsequent to the last event identified from the initial set of events. The events to be trimmed are events which corresponds to offsets subsequent to the offset of the last event in the initial set of events. Trimming the updated set of events results in the consumer obtaining the initial set of events that was previously retrieved. As a matter of explanation, the initial set of events may be obtained by trimming the updated set of events or the initial set of events may be obtained from a cache storing the initial set of events. However, in at least one embodiment, the initial set of events is obtained by trimming the updated set of events. As an example, when a consumer fails, the cache is deleted. The consumer loses the initial set of events stored in the cache. By obtaining and trimming the updated set of events, the consumer is able to obtain the previously retrieved initial set of events. The consumer then re-determines and re-transmits system updates corresponding to the initial set of events (Operation 214). Operation 214 is similar to Operation 204 described above. The re-transmission of the system updates is acknowledged by a receiving entity (Operation 216).

Continuing with the above example, the updated set of events 282 includes the initial set of events 280 and additional events 264 and 266. The consumer determines that event 262 is the last event in the initial set of events corresponding to the previously transmitted and unacknowledged system updates. The consumer identifies all events subsequent to event 262, in the updated set of events, as events to be trimmed. The consumer trims the additional events 264 and 266 from the updated set of events 282 to obtain the initial set of events 280. The consumer then re-determines system updates based on the initial set of events 280 and re-transmits the system updates based on initial set of events 280.

In an embodiment, the system updates transmitted by a stage one consumer, as described above with reference to FIGS. 2A-2E, are stored in a container partition (e.g., container partitions 116 and 118 illustrated in FIGS. 1A and 1B). A stage two consumer aggregates system updates from the container partition corresponding to a container, and transmits an aggregated system update for the container to a container service (or other service or component) for updating system information.

In an embodiment, each particular set of system updates is stored in the container partition by stage one consumer with an offset (or other identifier). The offset corresponds to a last-published event in a corresponding set of events that was used to determine that particular set of system updates. A stage two consumer obtains each particular set of system updates stored in the container partition. The stage two consumer determines the offset stored with the particular set of system updates. If any set of system updates previously aggregated by the stage two consumer to the container service, were associated with the same offset, then the particular set of system updates is determined to be a duplicate. Duplicate sets of system updates are dropped without any further processing by the stage two consumer. If the offset stored with the particular set of system updates is not associated with any system updates previously aggregated by the stage two consumer, then the stage two consumer aggregates the particular set of system updates to generate an aggregated system update.

In an embodiment, the stage two consumer transmits an aggregated system update to a container service for updating system information. The aggregated system update is transmitted with an identifier corresponding to the set of system updates corresponding to the aggregated system update. The identifier may identify a last-update in the set of system updates corresponding to the aggregated system update. The container service may transmit an acknowledgement to the stage two consumer to acknowledge receipt of the aggregated system update. The container service may further indicate that the aggregated system update has been applied to respective system information. Alternatively, the container service may reject the aggregated system update if the aggregated system update was previously received and applied by the container service. If the aggregated system update was previously received and applied by the container service, the container service drops the aggregated system update without re-application. Once the acknowledgement has been received from the container service, the stage two consumer consumes the next set of system updates in the container partition and re-iterates the process. If the stage two consumer does not receive any acknowledgement from the container service of receipt of an aggregated system update, the stage two consumer may resend the aggregated system update until the acknowledgement is received. The stage two consumer may also alert an administrator to troubleshoot an issue.

Embodiments describe herein may be used to achieve an "exactly-once" roll-up mechanism for rolling up system updates for updating system information. An exactly-once roll up mechanism ensure that the same system update is not applied multiple times to a set of system information.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   executing, by a device, a first retrieving operation to retrieve events from an event stream stored in a storage component, wherein executing the first retrieving operation comprises retrieving a first set of events from the event stream, the first set of events comprising a particular event in the event stream and events subsequent to the particular event in the event stream;
   determining, by the device, a first set of system updates corresponding to the first set of events retrieved using the first retrieving operation;
   transmitting, by the device, the first set of system updates corresponding to the first set of events retrieved using the first retrieving operation;
   responsive to determining that an acknowledgement, corresponding to the transmission of the first set of system updates, has not been received, performing at least operations (a)-(d):
      (a) executing, by the device, a second retrieving operation to retrieve events from the event stream stored in the storage component, wherein executing the second retrieving operation comprises retrieving a second set of events from the event stream, the second set of events comprising (a) the first set of events and (b) one or more additional events not included in the first set of events;
      (b) removing, by the device, the one or more additional events from the second set of events to obtain the first set of events that (a) is same as the first set of events retrieved using the first retrieving operation and (b) corresponds to the previously transmitted first set of system updates;
      (c) re-determining, by the device, the first set of system updates corresponding to the first set of events retrieved using the second retrieving operation;

(d) re-transmitting, by the device, the first set of system updates corresponding to the first set of events retrieved using the second retrieving operation;
receiving, by the device, an acknowledgement corresponding to the re-transmission of the first set of system updates.

2. The medium of claim 1,
wherein the first set of events is determined by: (a) selecting the particular event to include in the first set of events based on a current value of a start-read-pointer, associated with the event stream, identifying an offset corresponding to the particular event, and (b) selecting events, subsequent to the particular event, in the event stream when the first retrieving operation is executed.

3. The medium of claim 2,
wherein based on the execution of the first retrieving operation, the current value of the start-read-pointer is configured to a new offset that is immediately subsequent to an offset of a last-published event in the first set of events.

4. The medium of claim 3,
wherein the second set of events is determined by: (a) configuring the current value of the start-read-pointer to the offset corresponding to the particular event, (b) selecting the particular event to include in the second set of events based on the current value of the start-read-pointer identifying the offset corresponding of the particular event, and (c) selecting events, subsequent to the particular event, that are published in the event stream when the second retrieving operation is executed.

5. The medium of claim 1, wherein the operations further comprise transmitting, with the first set of system updates, an end-read-pointer indicating an offset, in the event stream, corresponding to a last-published event in the first set of events.

6. The medium of claim 1, wherein determining the first set of system updates comprises determining at least one system update by aggregating information from at least two events in the first set of events.

7. The medium of claim 1, wherein an event, in the first set of events, indicates an operation associated with objects within a container.

8. The medium of claim 1, wherein determining the first set of system updates comprises determining a system update for a particular container based on at least two events associated with two respective objects within the particular container.

9. The medium of claim 8, wherein one event, of the at least two events, specifies the addition of a first object to the particular container or a deletion of a second object from the particular container.

10. The medium of claim 1, wherein all events from the event stream are consumed by a single consumer.

11. The medium of claim 1, wherein events associated with objects in a particular container are distributed across two or more event streams in a plurality of event streams.

12. The medium of claim 1, wherein events associated with objects in a particular tenant are distributed across two or more event streams in a plurality of event streams.

13. The medium of claim 1, wherein trimming the second set of events comprises selecting the first set of events from the second set of events, and storing the first set of events separately from the second set of events.

14. The medium of claim 1, wherein retrieving and trimming the second set of events is responsive to determining that the first set of events are not available in a cache.

15. The medium of claim 1, wherein re-determining the first set of system updates corresponding to the first set of events is responsive to determining that the first set of system updates are not available in a cache.

16. The medium of claim 1, wherein transmitting the first set of system updates comprises transmitting the first set of system updates to a first container partition associated with a first container comprising objects corresponding to the first set of system updates.

17. The medium of claim 16, wherein a same particular consumer transmits the first set of system updates to the first container partition associated with the first container and transmits a second set of system updates to a second container partition associated with a second container.

18. The medium of claim 1,
wherein the first set of events is determined by: (a) selecting the particular event to include in the first set of events based on a current value of a start-read-pointer, associated with the event stream, identifying an offset corresponding to the particular event, and (b) selecting events, subsequent to the particular event, in the event stream when the first retrieving operation is executed;
wherein based on the execution of the first retrieving operation, the current value of the start-read-pointer is configured to a new offset that is immediately subsequent to an offset of a last-published event in the first set of events;
wherein the second set of events is determined by: (a) configuring the current value of the start-read-pointer to the offset corresponding to the particular event, (b) selecting the particular event to include in the second set of events based on the current value of the start-read-pointer identifying the offset corresponding of the particular event, and (c) selecting events, subsequent to the particular event, that are published in the event stream when the second retrieving operation is executed;
wherein the operations further comprise transmitting, with the first set of system updates, an end-read-pointer indicating an offset, in the event stream, corresponding to a last-published event in the first set of events;
wherein determining the first set of system updates comprises determining at least one system update by aggregating information from at least two events in the first set of events;
wherein determining the first set of system updates comprises determining a system update for a particular container based on at least two events associated with two respective objects within the particular container;
wherein one event, of the at least two events, specifies the addition of a first object to the particular container or a deletion of a second object from the particular container;
wherein all events from the event stream are consumed by a single consumer;
wherein trimming the second set of events comprises selecting the first set of events from the second set of events, and storing the first set of events separately from the second set of events;
wherein retrieving and trimming the second set of events is responsive to determining that the first set of events are not available in a cache;

wherein re-determining the first set of system updates corresponding to the first set of events is responsive to determining that the first set of system updates are not available in a cache;

wherein transmitting the first set of system updates comprises transmitting the first set of system updates to a first container partition associated with a first container comprising objects corresponding to the first set of system updates; and wherein a same particular consumer transmits the first set of system updates to the first container partition associated with the first container and transmits a second set of system updates to a second container partition associated with a second container.

19. A method comprising:

executing, by a device, a first retrieving operation to retrieve events from an event stream stored in a storage component, wherein executing the first retrieving operation comprises retrieving a first set of events from the event stream, the first set of events comprising a particular event in the event stream and events subsequent to the particular event in the event stream;

determining, by the device, a first set of system updates corresponding to the first set of events retrieved using the first retrieving operation;

transmitting, by the device, the first set of system updates corresponding to the first set of events retrieved using the first retrieving operation;

responsive to determining that an acknowledgement, corresponding to the transmission of the first set of system updates, has not been received, performing at least operations (a)-(d):

(a) executing, by the device, a second retrieving operation to retrieve events from the event stream stored in the storage component, wherein executing the second retrieving operation comprises retrieving a second set of events from the event stream, the second set of events comprising (a) the first set of events and (b) one or more additional events not included in the first set of events;

(b) removing, by the device, the one or more additional events from the second set of events to obtain the first set of events that (a) is same as the first set of events retrieved using the first retrieving operation and (b) corresponds to the previously transmitted first set of system updates;

(c) re-determining, by the device, the first set of system updates corresponding to the first set of events retrieved using the second retrieving operation;

(d) re-transmitting, by the device, the first set of system updates corresponding to the first set of events retrieved using the second retrieving operation;

receiving, by the device, an acknowledgement corresponding to the re-transmission of the first set of system updates;

wherein the method is executed by at least one device including a hardware processor.

* * * * *

UNITED STATES PATENT AND TRADEMARK OFFICE
CERTIFICATE OF CORRECTION

PATENT NO. : 10,180,863 B2
APPLICATION NO. : 15/338697
DATED : January 15, 2019
INVENTOR(S) : Sawhney et al.

Page 1 of 1

It is certified that error appears in the above-identified patent and that said Letters Patent is hereby corrected as shown below:

In the Specification

In Column 2, Line 64, delete "and or" and insert -- and/or --, therefor.

In Column 3, Line 44, delete "and or" and insert -- and/or --, therefor.

In Column 6, Line 50, delete "Ti," and insert -- T1, --, therefor.

Signed and Sealed this
Seventh Day of January, 2020

Andrei Iancu
*Director of the United States Patent and Trademark Office*